(12) United States Patent
Lusk et al.

(10) Patent No.: US 11,857,939 B2
(45) Date of Patent: Jan. 2, 2024

(54) PREDICTIVE SYSTEMS AND METHODS FOR PROACTIVE INTERVENTION IN CHEMICAL PROCESSES

(71) Applicant: Buckman Laboratories International, Inc., Memphis, TN (US)

(72) Inventors: Richard Lusk, Nesbit, MS (US); Paul Quinn, Memphis, TN (US)

(73) Assignee: Buckman Laboratories International, Inc., Memphis, TN (US)

( * ) Notice: Subject to any disclaimer, the term of this patent is extended or adjusted under 35 U.S.C. 154(b) by 165 days.

(21) Appl. No.: 17/466,310

(22) Filed: Sep. 3, 2021

(65) Prior Publication Data
US 2022/0072500 A1 Mar. 10, 2022

Related U.S. Application Data (60) Provisional application No. 63/228,211, filed on Aug. 2, 2021, provisional application No. 63/075,020, filed on Sep. 4, 2020.

(51) Int. Cl.
*B01J 19/00* (2006.01)
*G05B 13/04* (2006.01)

(52) U.S. Cl.
CPC ........ *B01J 19/0033* (2013.01); *G05B 13/042* (2013.01); *B01J 2219/00195* (2013.01); *B01J 2219/00243* (2013.01)

(58) Field of Classification Search
CPC .. G05B 13/042; G05B 13/048; B01J 19/0033; B01J 2219/00243; B01J 2219/00195
See application file for complete search history.

(56) References Cited

U.S. PATENT DOCUMENTS 3,038,785 A 6/1962 Braude et al.
3,087,035 A 4/1963 Forwald
(Continued)

FOREIGN PATENT DOCUMENTS

EP 2293164 A1 3/2011
EP 2469466 A1 6/2012
(Continued)

OTHER PUBLICATIONS

Search Report and Written Opinion for corresponding International patent application No. PCT/US2021/049027, dated Dec. 22, 2021, 12 pages.

*Primary Examiner* — Shogo Sasaki
(74) *Attorney, Agent, or Firm* — Patterson Intellectual Property Law (57) ABSTRACT

Various embodiments of the present disclosure relate to proactive dosing optimization chemical feed units producing an output solution (such as an oxidizing biocide) therefrom. Online sensors generate signals corresponding to directly measured variables for respective process components. Information is selectively retrieved from models relating combinations of input variables to respective industrial process states, wherein various current process states may be indirectly determined based on directly measured variables for respective system components. An output feedback signal is automatically generated corresponding to a detected intervention event based on the indirectly determined process state. A controller may receive the signal and implement, e.g., regulation of oxidizing biocide feed for optimization of end products and/or performance metrics.

20 Claims, 5 Drawing Sheets

(56) References Cited

U.S. PATENT DOCUMENTS

| | | | |
|---|---|---|---|
| 3,488,164 A | | 1/1970 | Sisler et al. |
| 3,947,668 A | | 3/1976 | Al-Shaikh et al. |
| 4,391,775 A | | 7/1983 | Huber et al. |
| 4,922,412 A | * | 5/1990 | Lane .................... G05B 13/044 |
| | | | 700/37 |
| 5,282,130 A | * | 1/1994 | Molnar .............. G05B 13/0205 |
| | | | 700/37 |
| 5,453,207 A | | 9/1995 | Simpson et al. |
| 5,519,605 A | * | 5/1996 | Cawlfield ............ G05B 13/048 |
| | | | 700/45 |
| 5,611,920 A | | 3/1997 | Simpson et al. |
| 6,007,780 A | | 12/1999 | Heredia |
| 6,253,113 B1 | * | 6/2001 | Lu .......................... G05B 11/42 |
| | | | 700/28 |
| 6,546,295 B1 | * | 4/2003 | Pyotsia .............. G05B 19/4185 |
| | | | 706/900 |
| 6,818,124 B1 | | 11/2004 | Simmons |
| 6,881,583 B2 | | 4/2005 | Kahle |
| 7,070,751 B2 | | 7/2006 | Tummala et al. |
| 7,261,821 B2 | | 8/2007 | Beardwood |
| 7,311,878 B2 | | 12/2007 | Singleton et al. |
| 7,332,076 B2 | | 2/2008 | Kouame |
| 7,349,760 B2 | | 3/2008 | Wei et al. |
| 7,387,736 B2 | | 6/2008 | Phillips et al. |
| 7,452,511 B2 | | 11/2008 | Schmitz et al. |
| 7,473,370 B2 | | 1/2009 | Kouame |
| 7,632,410 B2 | | 12/2009 | Heiss |
| 7,715,929 B2 | | 5/2010 | Skourup et al. |
| 7,817,150 B2 | | 10/2010 | Reichard et al. |
| 7,820,060 B2 | | 10/2010 | Mayer et al. |
| 7,837,883 B2 | | 11/2010 | Barak |
| 7,949,432 B2 | | 5/2011 | Rice |
| 8,051,383 B2 | | 11/2011 | Mccampbell et al. |
| 8,394,253 B2 | | 3/2013 | Peters et al. |
| 8,444,860 B2 | | 5/2013 | Garusi et al. |
| 8,518,270 B1 | | 8/2013 | Vineyard et al. |
| 8,808,500 B2 | | 8/2014 | Janak |
| 8,858,895 B2 | | 10/2014 | Kraus et al. |
| 8,918,217 B2 | | 12/2014 | Subbiah et al. |
| 8,940,150 B2 | | 1/2015 | Gunzinam et al. |
| 8,986,606 B2 | | 3/2015 | Nelson et al. |
| 9,151,023 B2 | | 10/2015 | Taylor et al. |
| 9,309,138 B2 | | 4/2016 | Ogiwara et al. |
| 9,341,560 B2 | | 5/2016 | Kolari et al. |
| 9,388,044 B2 | | 7/2016 | Gupta et al. |
| 9,477,936 B2 | | 10/2016 | Lawson et al. |
| 9,529,348 B2 | | 12/2016 | Kephart et al. |
| 9,630,847 B2 | | 4/2017 | Mcneel et al. |
| 9,713,331 B2 | | 7/2017 | Barak |
| 9,801,384 B2 | | 10/2017 | Barak |
| 9,957,697 B2 | | 5/2018 | Taylor et al. |
| 9,967,168 B2 | | 5/2018 | Wang |
| 10,155,662 B2 | | 12/2018 | Gatti et al. |
| 10,172,351 B2 | | 1/2019 | Kraus et al. |
| 2004/0098148 A1 | | 5/2004 | Retlich et al. |
| 2004/0260421 A1 | | 12/2004 | Persson et al. |
| 2005/0102067 A1 | | 5/2005 | Nelson et al. |
| 2008/0003305 A1 | | 1/2008 | Barak |
| 2009/0173697 A1 | | 7/2009 | Axtell et al. |
| 2009/0311164 A1 | | 12/2009 | Gupta et al. |
| 2009/0319058 A1 | | 12/2009 | Rovaglio et al. |
| 2010/0256795 A1 | | 10/2010 | Mclaughlin et al. |
| 2010/0257227 A1 | | 10/2010 | Mclaughlin et al. |
| 2010/0257228 A1 | | 10/2010 | Staggs et al. |
| 2011/0142959 A1 | | 6/2011 | Farone et al. |
| 2011/0257788 A1 | | 10/2011 | Wiemers et al. |
| 2012/0251996 A1 | | 10/2012 | Jung et al. |
| 2012/0328504 A1 | | 12/2012 | Debiemme-Chouvy |
| 2013/0018491 A1 | | 1/2013 | Kelly et al. |
| 2015/0203388 A1 | | 7/2015 | Gotthardt et al. |
| 2015/0329387 A1 | | 11/2015 | Sumrall et al. |
| 2015/0373985 A1 | | 12/2015 | Peters et al. |
| 2016/0152489 A1 | * | 6/2016 | Alber ..................... G05B 15/02 |
| | | | 700/271 |
| 2016/0362318 A1 | | 12/2016 | Simmons |
| 2017/0314205 A1 | | 11/2017 | Tu et al. |
| 2018/0127287 A1 | | 5/2018 | Garusi et al. |
| 2018/0346358 A1 | | 12/2018 | Fritz et al. |
| 2019/0084849 A1 | | 3/2019 | Giguere |
| 2019/0194034 A1 | | 6/2019 | Giguere et al. |
| 2019/0195721 A1 | | 6/2019 | Schumacher et al. |
| 2019/0276312 A1 | | 9/2019 | Gatti |
| 2020/0012265 A1 | | 1/2020 | Thomsen et al. |
| 2020/0231476 A1 | * | 7/2020 | Van Haute ................ C02F 1/76 |
| 2002/1033780 | | 11/2021 | Carey et al. |

FOREIGN PATENT DOCUMENTS

| | | |
|---|---|---|
| EP | 3562785 A1 | 11/2019 |
| WO | 2012070644 A1 | 5/2012 |
| WO | 2012166007 A1 | 12/2012 |
| WO | 2012166670 A2 | 12/2012 |
| WO | 2013048899 A3 | 6/2013 |
| WO | 2013145440 A1 | 10/2013 |
| WO | 2013176032 A1 | 11/2013 |
| WO | 2015116423 A1 | 8/2015 |
| WO | 2015171019 A1 | 11/2015 |
| WO | 2018122857 A1 | 7/2018 |
| WO | 2019017930 A1 | 1/2019 |
| WO | 2019239401 A1 | 2/2019 |
| WO | 2020023998 A1 | 6/2020 |

* cited by examiner

PREDICTIVE SYSTEMS AND METHODS FOR PROACTIVE INTERVENTION IN CHEMICAL PROCESSES

CROSS-REFERENCES TO RELATED APPLICATIONS

This application claims benefit of U.S. Provisional Patent Application No. 63/075,020, filed Sep. 4, 2020, and U.S. Provisional Patent Application No. 63/282,211, filed Aug. 2, 2021, both of which are hereby incorporated by reference.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

FIELD OF THE INVENTION

The present invention relates generally to predictive systems and methods for use in chemical processes, such as for example oxidizing biocide generation. More particularly, embodiments of inventions as disclosed herein relate to systems and methods to proactively alert users or implement automated interventions in chemical processes via data analytics.

BACKGROUND

Chemical feed skids are conventionally implemented by those of skill in the art for the reliable and consistent dosing of chemicals into various types of industrial process applications. One exemplary but non-limiting example of an oxidizing biocide solution which is generated by a chemical feed skid is monochloramine (MCA). MCA has been implemented as an alternative to conventional chlorination for control of microbiological growth across a spectrum of industries including, e.g., pulp and paper industries, food and beverage processing, water treatment and industrial waste treatment facilities, and the like. Monochloramine is much more stable than free chlorine, does not dissipate as rapidly, and has a much lower tendency to convert organic materials into chlorocarbons such as chloroform and carbon tetrachloride. Monochloramine also does not vaporize into the environment but rather remains in solution when dissolved in aqueous solutions and does not ionize to form weak acids. This property is at least partly responsible for the biocidal effectiveness of monochloramine over a wide pH range.

One example of a conventional method for producing monochloramine includes mixing an oxidant (e.g., a solution of sodium hypochlorite), an amine source (e.g., a mixture of ammonia-containing substances) and water in a specific ratio using a monochloramine generator. The chlorine source used in the generation of monochloramine may preferably be a solution of industrial bleach (sodium hypochlorite) with a concentration range generally between 10 and 16 percent (as chlorine).

Currently, chemical feed skids of this nature are prone to mineral scale forming on the interior of the system infrastructure, including piping, mixers, valves, instrumentation and other devices exposed to the high alkaline conditions of the chemistry. To combat this, many applications use softeners upstream of the system to remove water hardness or feed an anti-scalant product inline to reduce the ability for scale to adhere. However, over time the majority of units must be acid cleaned to remove scale that has built up inside the system. For systems that use a softener, the softener must be manually maintained by, e.g., refilling with salt.

Scaling of the system may typically result in reduced efficiency, reduced capacity, faulty reading of instrumentation, reduction in mixing capability, and/or failure of mechanical components. The overall implications can range from ineffective biological treatment of end processes to system malfunction.

Conventional systems lack online methods to determine the need for acid cleaning using directly and automatically measured system parameters that would then trigger an automated cleaning procedure. Current methods to detect and remove scale from these systems are primarily based on manual visual inspection of the system followed by a manual implementation of a clean-in-place (CIP) procedure.

The conventional practices are associated with numerous undesirable limitations. For example, manual inspection of equipment may be performed too frequently, which results in unnecessary inspections and a corresponding waste of time (i.e., site visits, mechanical disassembly, etc.) and energy. Alternatively, if inspections are conducted too infrequently this may lead to unchecked scale formation. Manual inspection of upstream conditions (e.g., softener) also typically results in unnecessary inspections wasting time (site visits) and energy, or inspections too infrequently leading to reduction in softener performance with increases the scaling rate of the equipment Online sensors to directly measure contamination (e.g., scale) are potentially available but notably expensive, difficult to maintain, and unreliable with respect to results.

Conventional methods implementing sensors to measure softener function have many of the same limitations: they are expensive, and/or require manual testing (are not online).

It would therefore be desirable to provide an array of online sensors capable of directly measuring one or more process variables, from which a contamination state of the chemical feed skid can be indirectly determined, thereby optimizing unit performance by cleaning on proper intervals (not too frequently, which costs money, and not too infrequently, which can reduce efficiency and cause operational problems).

It would further be desirable to provide feedback signals based on the determined contamination state of the chemical feed skid, for example based on contamination events as automatic triggers, to perform automated cleaning functions or regulation of upstream characteristics, thereby reducing the likelihood of contamination (e.g., scaling) events occurring due to optimized upstream content (e.g., softener) operation.

One of skill in the art may further appreciate that the generation of an oxidizing biocide, such as monochloramine, is dependent on accurate control of the stoichiometric ratio of two or more chemical precursors, where at least one chemical precursor contains a halogenated material that is prone to decomposition with time, temperature, exposure to sunlight, exposure to contaminants, or otherwise. Proper maintenance of the stoichiometric ratio of the two precursors is paramount to generating the intended oxidizing biocide solution.

Conventional equipment to directly measure the concentration of the halogenated material is either very costly, inaccurate, unreliable, prone to drift, prone to fouling, and/or requires routine maintenance and service. Therefore, end users routinely take manual samples of the halogenated precursor to measure its concentration in order to manually adjust the volumetric ratio of the precursor pumping rates.

This manual solution is undesirable as it results in unnecessary service visits, time, and effort. It also may result in responding too slowly to degradation or other meaningful variations in the concentration of the halogenated material, wherein the efficiency of generating the oxidizing biocide solution has been reduced such that its effectiveness as a microbiological control agent has been compromised. An upset of the stoichiometric ratio of the active ingredients contained within the precursors can result in a significant decrease in the intended biocide generation efficiency, as well as generation of unsafe/hazardous materials.

Generally stated, it would further be desirable to provide systems and methods including or implementing models/algorithms based on the measurement of one or more control parameters. Such systems and methods may directly address problems in the art, including: a lack of accountability of the variability of the incoming water quality and its effect on the measurement of said control parameter(s); a lack of measurement of upstream process conditions that impact the response of measured control parameter(s), such as measurement of the qualities of a pre-dilution of one or more of the chemical precursors, ambient environmental conditions, accounting for the presence of upstream equipment to alter the incoming water/precursor quality, and the like; and a lack of accountability on the variability of different precursor vendor/manufacturers with respect to quality, purity, and the like.

Still another current problem in many industries and applications is the inability to optimize oxidizing biocide dosing regimens. The technology that exists to measure the amount of oxidizing biocide in processes in real time, including but not limited to reagent based and amperometric halogen sensors, as well as oxidation/reduction potential (ORP) sensors, are often unreliable, require constant cleaning and calibration, are prone to fouling, and are not ion specific enough to work in difficult water matrices. Therefore, current "closed loop" technologies using a sensor to measure a relevant process variable and controlling oxidizing biocide feed to a setpoint often result in underfeed or overfeed of the chemistry.

Underfeeding of the chemistry may result in process upsets, including reduction in efficiency of equipment (heat exchangers, cooling towers, chillers, etc.), negatively impact quality parameters of the end product being produced (tissue, paper, linerboard, liquid packaging, etc.), and lead to an outbreak of pathogenic microbiological agents capable of causing illness in living beings that may be exposed.

Overfeeding of the chemistry may result in damage to process equipment and components via corrosion that long term may cause system breakage and overall unreliability/diminished efficiency. The addition of too much biocide may also result in worker exposure due to vapors that are released from the process, resulting in lachrymation or other health problems. Overfeeding may also result in higher costs for the end user, and a larger potential impact on wastewater treatment and/or discharge limitations.

BRIEF SUMMARY

In view of some or all of the aforementioned issues and objectives, it would be desirable to supplement traditional control methods with advanced analytical techniques, as well as online and offline key performance metrics of the process/application, to develop application specific models to, e.g., regulate oxidizing biocide dosages and identify actionable insights including but not limited to overfeeding and underfeeding conditions to alert an end user. Further, predictive models in accordance with the present disclosure may be deployed to automatically adjust or enable adjustments to the feed equipment so that, e.g., the biocide dosage is optimized to minimize microbiological contamination without overfeeding.

Systems as disclosed herein may preferably implement accessible visualization graphics, alarms, notifications, and the like via onboard user interfaces, mobile computing devices, web-based interfaces, etc., to supplement any automated capabilities with actionable insights relating to the associated processes.

Exemplary techniques for predictive model development may include supervised and unsupervised learning, hard and soft clustering, classification, forecasting, and the like.

Various sensors may be implemented in accordance with the present disclosure for understanding in real time the amount of oxidizing biocide contained within an application or process. Exemplary such sensors may include, without limitation, sensors configured to generate output signals corresponding to values of pH, oxidation-reduction potential (ORP), chlorine, monochloramine, and the like. Various sensors may further, or in the alternative, be implemented in accordance with the present disclosure for understanding in real time parameters that may influence the ability of a microbiological contaminant to reproduce at a high rate of speed. Exemplary such sensors may include, without limitation, sensors configured to generate output signals corresponding to values of temperature, flow, conductivity, pH, ORP, and the like.

Offline measurements, manually generated or otherwise, may further be incorporated within the scope of the present disclosure for determining an amount of oxidizing biocide contained within an application or process, and/or system parameters that may influence the ability of a microbiological contaminant to reproduce at a high rate of speed and/or the amount of microbiological contamination contained within an application or process.

An exemplary object of systems, methods, and associated algorithms as disclosed herein may be implementing a novel combination of sensors and online data to understand in real time a key performance metric of an industrial process, which through optimization of said data may lead to improvements in operability and performance.

Another exemplary object of systems, methods, and associated algorithms as disclosed herein may be providing advanced analytical techniques to develop scalable and reliable control algorithms for specific applications or processes to regulate and control oxidizing biocide feed as described above to prevent overfeeding and underfeeding of said oxidizing biocide.

Another exemplary object of systems, methods, and associated algorithms as disclosed herein may be deploying customized algorithms to an edge device that is capable of controlling and regulating oxidizing biocide feed to meet the objectives as described above, substantially in real time.

Another exemplary object of systems, methods, and associated algorithms as disclosed herein may be deploying an updating system configuration from a remote location to an edge device that is capable of controlling and regulating oxidizing biocide feed to meet the objectives as described above, substantially in real time.

A particular embodiment of a method is disclosed herein for dosing optimization for a chemical feed unit receiving at least one input water source and producing at least one output solution. A plurality of online sensors generates signals corresponding to directly measured variables for respective process components, and data corresponding to the directly measured variables for each of the respective components are transmitted to a remote server. Information is selectively retrieved from models relating combinations of input variables to respective process states in at least one of the chemical feed unit, the output solution, and the at least one input water source. Responsive to real-time data corresponding to the directly measured variables for the respective system components, the method further includes indirectly determining a process state in at least one of the chemical feed unit, the output solution, and the at least one input water source, and automatically generating an output feedback signal corresponding to a detected intervention event based on the indirectly determined process state.

In one exemplary aspect of the above-referenced embodiment, the output solution from the chemical feed unit comprises an oxidizing biocide such as monochloramin.

In another exemplary aspect of the above-referenced embodiment, the indirectly determined process state may comprise an end product quality and/or a performance metric corresponding to an amount of the oxidizing biocide present, and the output feedback signal may be generated to regulate at least one dose rate of the oxidizing biocide.

In another exemplary aspect of the above-referenced embodiment, the directly measured variables by online sensors for respective chemical feed unit components may comprise measured variables corresponding to one or more of: a pH value of diluted hypochlorite; a pH value for the monochloramine mixture; an oxidation-reduction potential; and an incoming water conductivity.

In another exemplary aspect of the above-referenced embodiment, at least one of the models relates combinations of input variables to a predicted aggregation of contamination in at least one portion of the chemical feed unit. The indirectly determined process state comprises an indirectly determined contamination state of at least one portion of the chemical feed unit, and the output feedback signal corresponds to a detected contamination event based on the indirectly determined contamination state. The contamination event may for example be detected based on a threshold violation with respect to the indirectly determined contamination state.

In another exemplary aspect of the above-referenced embodiment, the contamination state of the at least one portion of the chemical feed unit is indirectly determined further based on derivative variables for respective chemical feed unit components based on one or more of the directly measured variables by the online sensors, the derivative variables corresponding to one or more of: a hypochlorite dilution rate; a hypochlorite volume passing through the chemical feed unit over time; and a water volume passing through the chemical feed unit over time.

In another exemplary aspect of the above-referenced embodiment, at least one of the models relates combinations of input variables to a predicted true ratio between two or more chemical precursors used to generate the output solution, the indirectly determined process state comprises an indirectly determined active ingredient state for at least one of the two or more chemical precursors, and the output feedback signal corresponds to a detected intervention event based on the indirectly determined active ingredient state. The intervention event may for example be detected based on a threshold violation with respect to the indirectly determined active ingredient state for the at least one of the two or more chemical precursors.

In another exemplary aspect of the above-referenced embodiment, the active ingredient state for the at least one of the two or more chemical precursors is indirectly determined from derivative variables further based on one or more of the directly measured variables by the online sensors.

In another exemplary aspect of the above-referenced embodiment, the output feedback signal is provided to dynamically regulate a composition of at least one chemical precursor, responsive to the indirectly determined active ingredient state. The intervention event may for example be predicted based on a non-threshold violation with respect to the indirectly determined active ingredient state.

It may be appreciated that various ones of the above-referenced aspects may be provided individually or otherwise in combination with respect to the above-referenced embodiment.

In another embodiment, a system is disclosed herein for dosing optimization in a chemical feed unit receiving at least one input water source and producing at least one output solution. The system may include a plurality of online sensors, one or more communications devices functionally linked to the plurality of online sensors and configured to generate messages to a remote server via a communications network, wherein the generated messages comprise data corresponding to the directly measured variables for each of the respective components, the remote server comprises or is functionally linked to a data storage further comprising models relating combinations of input variables to respective process states in at least one of the chemical feed unit, the output solution, and the at least one input water source, and otherwise may be further configured to direct the performance of steps according to the above-referenced method embodiment and any one or more of the above-referenced aspects.

Numerous objects, features and advantages of the embodiments set forth herein will be readily apparent to those skilled in the art upon reading of the following disclosure when taken in conjunction with the accompanying drawings.

DETAILED DESCRIPTION

Referring generally to FIGS. 1-5, various exemplary embodiments of an invention may now be described in detail. Where the various figures may describe embodiments sharing various common elements and features with other embodiments, similar elements and features are given the same reference numerals and redundant description thereof may be omitted below.

Briefly stated, systems and methods as disclosed herein may be implemented to proactively alert users or implement automated dosing optimization in chemical processes via data analytics.

In one particular embodiment as described in more detail below, a system and method may be provided to determine if an acid boil-out to remove mineral scale and/or biological fouling of a chemical feed skid is required, where that chemical feed skid is one that generates an oxidizing biocide solution (monochloramine in a particular instance as referred to throughout the present disclosure, but without limitation on the scope of invention) at an alkaline pH from multiple precursors. The algorithm to determine if a boil-out is required is built using data that comes directly from the feed skid and includes, but is not limited to water conductivity, temperatures, flow rates, pH, run time, etc.

In another embodiment as described in more detail below, a system and method (which may be independent, or otherwise part of the same system and further supplement the same method as previously discussed) may be provided to predictively model the true stoichiometric ratio of two chemical precursors used to generate an oxidizing biocide in real time, wherein at least one chemical precursor having an active ingredient that varies in concentration over time is indirectly monitored and/or determined remotely, so that for example volumetric flow adjustments can be made to optimize efficiency and performance of said oxidizing biocide.

In another embodiment as described in more detail below, a system and method (which may also be independent, or otherwise part of the same system and further supplement the same method(s) as previously discussed) may relate to controlling the amount of an oxidizing biocide fed to a commercial or industrial process to regulate the amount of microbiological contamination within the process. Such a method may include capturing both online and offline operational and quality data of the process to develop and deploy application specific control logic such that the microbiological contamination is minimized, while optimizing key process performance metrics and oxidizing biocide dosing efficiency. Both streaming and manually entered data may for example be sent to a remote server, where application specific algorithms are developed and pushed back down to an edge device to regulate the biocide feed along one or more points of the process.

Figure 1:
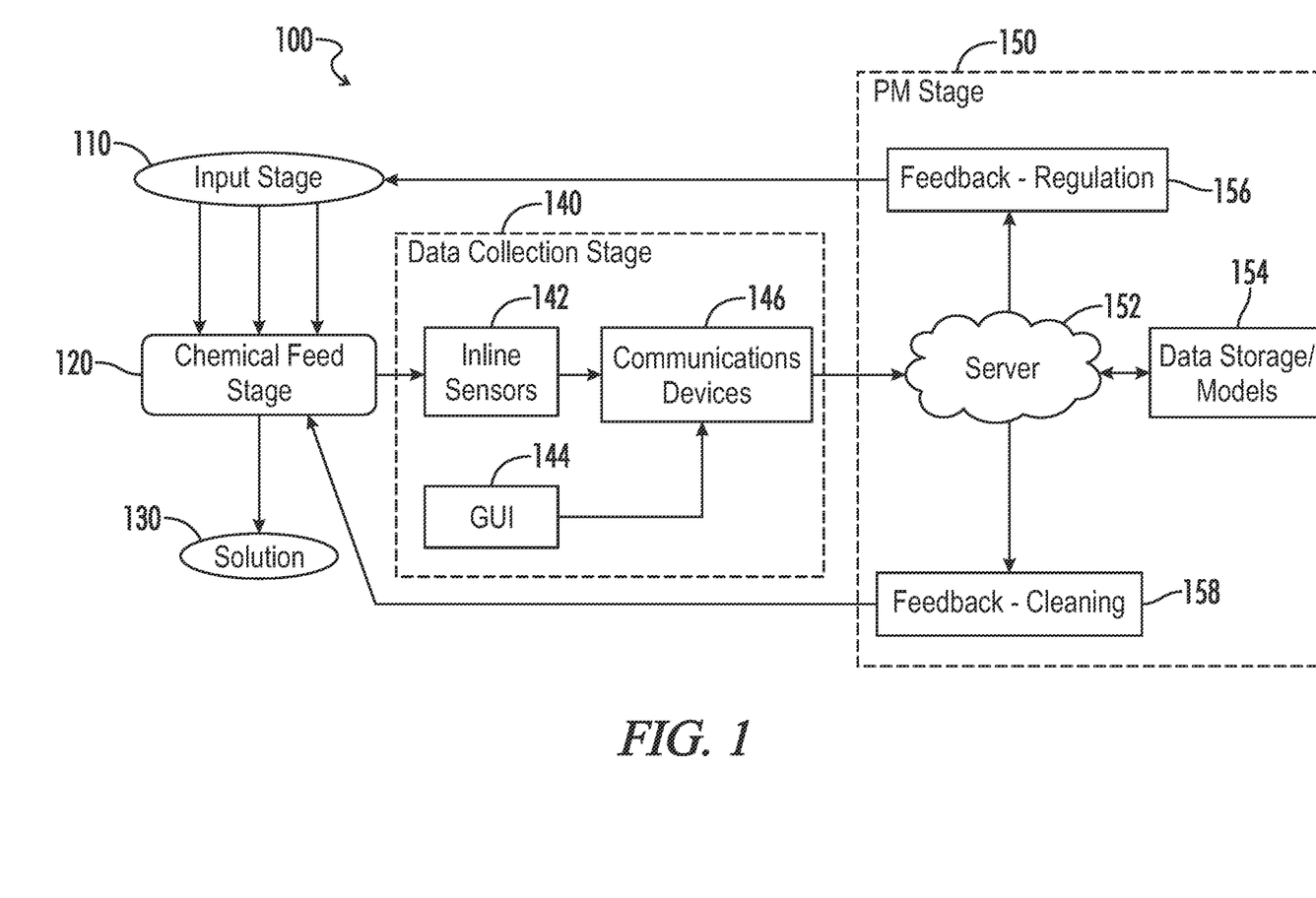
FIG. 1 is a block diagram representing an exemplary embodiment of a system as disclosed herein.

Referring initially to FIG. 1, an embodiment of a hosted system 100 as disclosed herein may be provided in association with, or even in some cases include, various stages in an industrial plant including an input stage 110 providing one or more streams of content to a chemical feed stage 120, which further provides an output solution such as, e.g., monochloramine (hereinafter "MCA"). In an embodiment, the input stage may include a first precursor including a bleach solution and a second precursor including an amine solution, each of which are fed to a defined area to form a mixture, such as a reaction mixture, from which an MCA product is produced. The MCA product can be applied, for example, to treatment of aqueous end solutions, such as waters, pulps, aqueous containing streams, and the like, and in certain alternative embodiments the supplied oxidant and amine reactants used to make the MCA product can be combined directly in the end solution for in-situ production of the treatment product, or the reactants can be combined onsite and in advance of the end solution. The defined area in which the reactants are shown to be combined may comprise a vessel or line such as, for example, a tank, pipe, conduit, reactor, bath, stream, or container, and the like. Additional supply reactants, not shown in this illustration, can be used depending on the reaction chemistry involved.

The term "industrial plant" as used herein may generally connote a facility for production of goods, independently or as part of a group of such facilities, and may for example but without limitation involve an industrial process and chemical business, a manufacturing industry, food and beverage industry, agricultural industry, swimming pool industry, home automation industry, leather treatment industry, paper making process, and the like.

A system "host" as referred to herein may generally be independent of a given industrial plant, but this aspect is not necessary within the scope of the present disclosure. The system host may be directly associated with an embodiment of the cloud-based server system 100 and capable of directly or indirectly implementing predictive analysis and preventative maintenance operations as disclosed herein for each of a group of industrial plants.

A data collection stage 140 may for example include a plurality of sensors 142 positioned online with various respective components of the chemical feed stage 120 and/or the input stage 110 and/or the output solution 130. Some or all of the sensors 142 may preferably be configured to continuously generate signals corresponding to real-time values for conditions and/or states of the respective components. The sensors may be configured to calibrate or otherwise transform raw measurement signals into output data in a form or protocol to be processed by downstream computing devices, or in various embodiments one or more intervening computing devices or controllers (not shown) may be implemented to receive raw signals from some or all of the sensors and provide any requisite calibration or transformation into a desired output data format.

The term "sensors" may include, without limitation, physical level sensors, relays, and equivalent monitoring devices as may be provided to directly measure values or variables for associated process components or elements, or to measure appropriate derivative values from which the process components or elements may be measured or calculated.

The term "online" as used herein may generally refer to the use of a device, sensor, or corresponding elements proximally located to a container, machine or associated process elements, and generating output signals substantially in real time corresponding to the desired process elements, as distinguished from manual or automated sample collection and "offline" analysis in a laboratory or through visual observation by one or more operators.

Individual sensors 142 may be separately mounted and configured, or the system 100 may provide a modular housing which includes, e.g., a plurality of sensors or sensing elements 142. Sensors or sensor elements may be mounted permanently or portably in a particular location respective to the chemical feed stage 120, or may be dynamically adjustable in position so as to collect data from a plurality of locations during operation, for example further including the input stage 110, and/or the output solution 130 from the chemical feed stage.

Online sensors 142 as disclosed herein may provide substantially continuous measurements with respect to various process components and elements, and substantially in real-time. The terms "continuous" and "real-time" as used herein, at least with respect to the disclosed sensor outputs, does not require an explicit degree of continuity, but rather may generally describe a series of measurements corresponding to physical and technological capabilities of the sensors, the physical and technological capabilities of the transmission media, the physical and technological capabilities of any intervening local controller, communications device, and/or interface configured to receive the sensor output signals, etc. For example, measurements may be taken and provided periodically and at a rate slower than the maximum possible rate based on the relevant hardware components or based on a communications network configuration which smooths out input values over time, and still be considered "continuous."

While sensors may be available for directly measuring control parameters such as for example contamination levels in a particular stage or component of the industrial process, or the concentration of halogenated material in a chemical precursor, as previously noted herein such sensors may be prohibitively expensive or unreliable. Accordingly, various embodiments of a system 100 as disclosed herein implement sensors 142 in a data collection stage 140 which directly sense values, levels, states, etc., of variables other than the specified control parameter (e.g., contaminant) at issue, and which are more reliable and readily available for implementation, wherein the process state (e.g., contamination state and/or active ingredient state) is indirectly determined or predicted at the predictive maintenance (cloud-based computing) stage of the system.

The data collection stage 140 may further include a graphical user interface (GUI) 144 wherein users such as operators, administrators, and the like can provide periodic input with respect to conditions or states of additional components of relevance to the downstream algorithms as further discussed herein. The GUI 144 may also be in functional communication with a hosted server 152 and/or local process control units (not shown) to receive and display process-related information, or to provide other forms of feedback with respect to, e.g., cleaning or replenishment processes as further discussed herein. The term "user interface" as used herein may unless otherwise stated include any input-output module with respect to the hosted data server including but not limited to: a stationary operator panel with keyed data entry, touch screen, buttons, dials or the like; web portals, such as individual web pages or those collectively defining a hosted website; mobile device applications, and the like. Accordingly, one example of the user interface may be as generated remotely on a user computing device 120 and communicatively linked to the remote server 110.

Alternatively, an example of the GUI 144 may within the scope of the present disclosure be generated on a stationary display unit in an operator control panel (not shown) associated with a production stage of an industrial plant.

The data collection stage 140 may further include one or more communications devices 146 configured to receive output signals from the online sensors 142 and to transmit corresponding output data to a hosted server 152 via, e.g., a communications network. A communications device may be stand-alone or alternatively be comprised of a local controller configured for example to direct the collection and transmittal of data from the industrial plant to the cloud server, and further to direct output signals from the server to other process controllers at the plant level or more directly to process actuators in the form of control signals to implement automated interventions. In some embodiments the communications device or local controller may be omitted, where for example data collection tools are distributed to directly transmit data streams via the communications network, and a user computing device which also displays and implements the GUI 144 is implemented to receive the output signals from the server, etc. In some embodiments, the communications device or local controller may be comprised of at least part of an industrial plant's resident control system.

In an embodiment (not shown), a conversion stage may be added for the purpose of converting raw signals from one or more of the online sensors 142 to a signal compatible with data transmission or data processing protocols of the communications network and/or cloud server-based storage and applications. A conversion stage may relate not only to input requirements but also may further be provided for data security between one or more sensors and the cloud-based server 152, or between local communications devices 146 such as a local controller and the server.

The term "communications network" as used herein with respect to data communication between two or more system components or otherwise between communications network interfaces associated with two or more system components may refer to any one of, or a combination of any two or more of, telecommunications networks (whether wired, wireless, cellular or the like), a global network such as the Internet, local networks, network links, Internet Service Providers (ISP's), and intermediate communication interfaces. Any one or more conventionally recognized interface standards may be implemented therewith, including but not limited to Bluetooth, RF, Ethernet, and the like.

A preventative maintenance stage 150 as represented in FIG. 1 may be provided with a hosted server 152 or network of hosted servers linked to the communications devices 146 as discussed above. The hosted server 152, which may be associated with a third party to the industrial plant or alternatively may be a server associated with the industrial plant or an administrator thereof, further may include or be linked to a data storage device or network 154 including models and/or algorithms relating to a process state and/or intervention event for the input stage 110, chemical feed stage 120, and/or solution 130 from the industrial plant. A cloud-based server 152 implementation may accordingly be configured to process data provided from the industrial plant, in view of iteratively developed preventative maintenance models residing in the data storage network 154, and to generate feedback to respective components in the industrial plant relating to, e.g., automated upstream regulation 156 at the input stage and/or automated cleaning procedures 158 at the chemical feed stage.

The above-referenced system 100 may be implemented in an embodiment of a method 200 as further discussed below with illustrative reference to FIG. 2, or in an embodiment of a method 300 as further discussed below with illustrative reference to FIG. 3. Alternative embodiments of a system may be implemented for either method 200, 300 within the scope of the present disclosure unless otherwise stated. Depending on the embodiment, certain acts, events, or functions of any of the algorithms described herein can be performed in a different sequence, can be added, merged, or left out altogether (e.g., not all described acts or events are necessary for the practice of the algorithm) Moreover, in certain embodiments, acts or events can be performed concurrently, e.g., through multi-threaded processing, interrupt processing, or multiple processors or processor cores or on other parallel architectures, rather than sequentially.

One of skill in the art may appreciate that numerous steps in the process of generating a desired output solution 130 via an input stage 110 and a chemical feed stage 120 are conventionally known and generally dependent on the type of solution being generated, and detailed discussion of such steps or processes may be omitted herein as being generally outside of the scope of an invention as disclosed herein.

Figure 2:
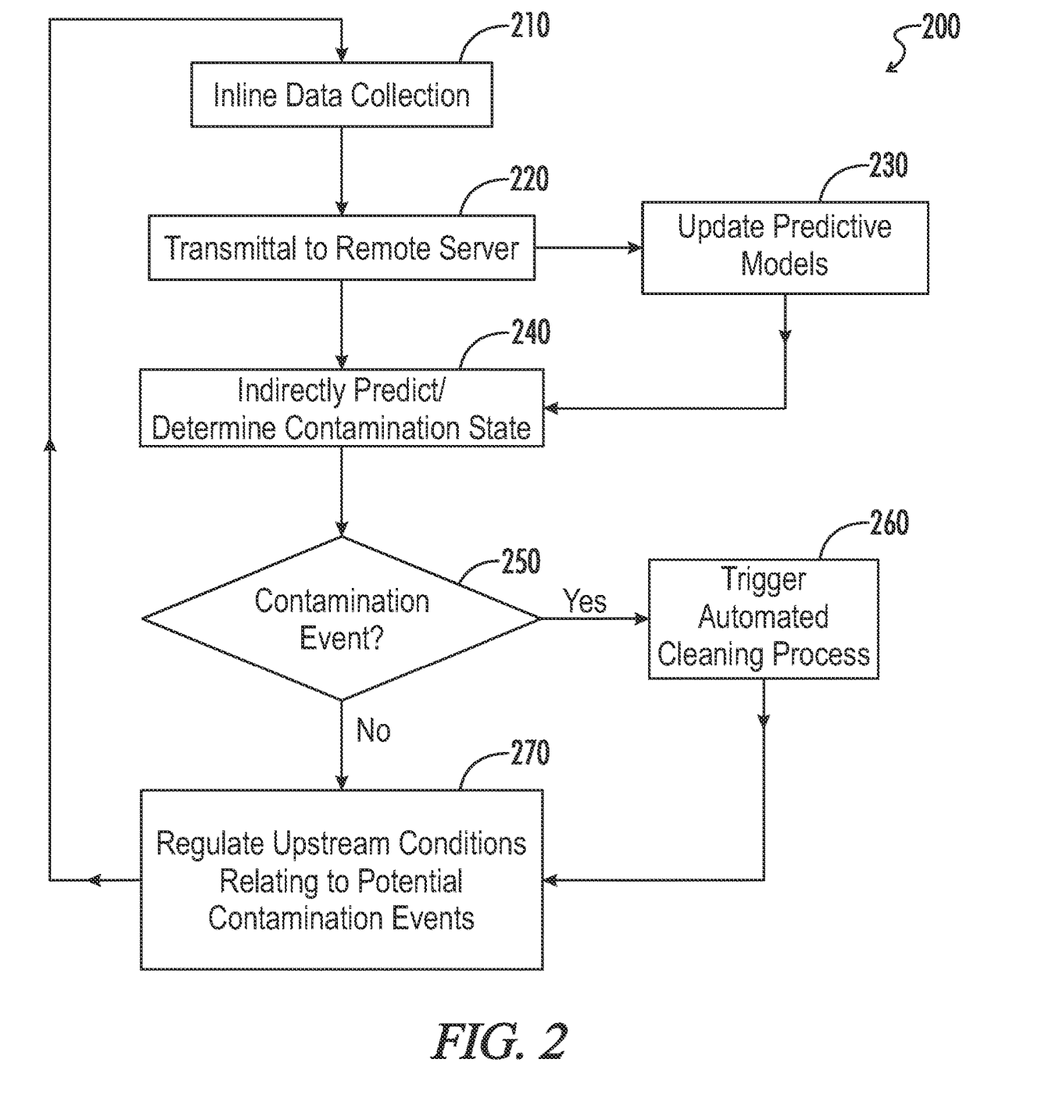
FIG. 2 is a flowchart representing an exemplary embodiment of a method as disclosed herein.

More particularly referring to FIGS. 1 and 2, for a given process, e.g., the generation of an MCA mixture, the method 200 includes online data collection (step 210) with respect to a plurality of process components in one or more of the input stage 110, the chemical feed stage 120, and the output solution 130 itself.

The outputs from the data collection stage 140 are transmitted via a communications network to a remote (e.g., cloud-based) server network 152 (step 220).

The server 152 may further transmit the outputs from the data collection stage 140 of the industrial plant to a separate server and/or data storage network 154 for iterative development and updating of predictive models associated with the present disclosure (step 230). As but one illustrative example, a predictive model may be constructed to account for changes in furnish, grade, equipment, and the like, wherein "digital twin" virtual representations in the cloud-based network continuously compare actual performance with expected performance to enable or otherwise facilitate the prediction of future trends and proactive interventions. Such virtual representations may include pairing of digital and physical data and further combining of the same with learning systems such as for example artificial neural networks. Real-time data may be provided throughout a process or the life cycle of a respective asset to generate virtual representations for estimation of a given parameter or performance metric, wherein subsequent comparison of predicted or estimated such parameters or metrics with a corresponding measured or determined parameter or metric may preferably be implemented as feedback for machine learning algorithms executed at the server level.

Initial models may for example be constructed based on data collected and optionally aggregated from multiple chemical feed skids distributed across any number of industrial locations.

In a particular exemplary embodiment relating to automated cleaning (e.g., acid boilout) or upstream softener replenishment, data may be collected in accordance with each of the following components:

An online measurement of pH value of diluted hypochlorite may be one of the driving factors for the model, and would not require manual intervention from anyone in the field. The data may be collected, e.g., every sixty seconds, and a higher system pH will typically correlate with higher scaling rates.

An online measurement of pH of the MCA mixture, collected e.g. every sixty seconds, may also be one of the driving factors for the model, and does not require manual intervention from anyone in the field. Low pH is indicative of an excess of chlorine, which causes unintended reactions that depress the pH. Standard pH range may be between 10.5 and 11.5, with higher system pH typically correlating with higher scaling rates.

Incoming water conductivity (related to hardness), collected e.g. every sixty seconds, may also be one of the driving factors for the model. Higher water conductivities typically correlate with higher scaling rates. As the softener replaces calcium with sodium ions, the difference in conductivity between a functioning softener and non-functioning softener may not be able to be detected via conductivity alone.

A dilution rate of hypochlorite in water may be measured or derived every sixty seconds to adjust for or correlate the dilute hypochlorite pH value. Higher dilutions may result in higher dilute hypochlorite pH readings.

A hypochlorite/mcap volume ratio may be measured or derived every sixty seconds to adjust for or correlate the MCA pH value, wherein higher dilutions may result in higher MCA pH readings.

One or more relevant pulp flow rates may be measured every sixty seconds to be able to calculate the dilution rate for hypochlorite and the volume ratio for the hypo/mcap, and for calculating the totalized volume for each flow stream.

A unit status (e.g., dosing, flushing, idle) may be measured with each process change, for example to filter out flush/idle data.

A hypochlorite volume over time may be measured or derived every sixty seconds to determine how much hypochlorite has passed through the unit for a given amount of time. For example, higher ratios of hypochlorite volume with respect to pipe diameter may correlate with a faster scaling rate.

An MCA volume over time may be measured or derived every sixty seconds to determine how much MCA has passed through the unit for a given amount of time. For example, higher ratios of MCA volume with respect to pipe diameter may correlate with a faster scaling rate.

A water volume over time may be measured or derived every sixty seconds to determine a total flow through the system. For example, a higher total volume for a given pipe diameter may correlate with a faster scaling rate.

A system inner pipe diameter, an online mixer size, and/or application line sizes may be one-time measurements provided to the system, as smaller inner diameters may for example require more frequent cleaning when all other variables are held constant.

An online antiscalant flow may be measured or otherwise derived every sixty seconds.

Whether or not a softener is being utilized may be a one-time measurement provided to the system. In addition, measurement may be provided on process changes with respect to a softener being refilled with salt or cleaned.

A visual inspection may be provided daily with respect to a given unit, to provide feedback regarding whether or not an acid clean is required, thereby for example further developing or otherwise providing confirmation of model parameters.

As previously noted, once a sufficient dataset is built, models may be developed relating combinations of input variables to a predicted aggregation of contamination in at least one portion of the chemical feed unit, for example to predict when it is necessary to acid clean some or all of the chemical feed unit, or to replenish the brine in a water softener. Various embodiments of models for predicting contamination events (e.g., one or more events identified as requiring acid cleaning) may be constructed for respective system implementations, for example: systems that use a softener; systems that use online antiscalant; systems that use neither a softener nor an antiscalant; systems that use both of a softener and an antiscalant, and the like.

In various exemplary embodiments, contamination events may be identified via threshold-based analysis of an indirectly determined contamination state. Alternatively, or in addition, non-threshold based analysis may be used to for example predict timing of a contamination event based on the indirectly determined contamination state. In the context of, for example, an acid cleaning procedure for the chemical feed stage, the system may typically automatically implement such a procedure upon determining the presence of a contamination event, or may schedule such a procedure at a defined time in the future based upon a predicted contamination event. In the context, for example, of brine replenishment in a water softener, the system may implement non-threshold based analysis to regulate brine replenishment based on the determined contamination state and with the objective of at least delaying contamination events in the chemical feed stage, predicted or otherwise.

Various models may only require data that is automatically streamed or manually acquired only once (e.g., requiring no "routine" manual data collection).

Various embodiments of these models may be deployed in the cloud to provide alerts to users to prompt them to acid clean their systems or replenish their softeners. The users may then be automatically prompted to provide feedback on the accuracy of the models, which would preferably be used to fine tune the models. In an embodiment, upon system prediction of the need for acid cleaning, a message may be generated to a user interface associated with an operator, administrator, representative, or the like for confirmation or approval to initiate an automated cleaning procedure. Such approval may for example be received via user actuation of a dedicated button or other interface tool. Alternatively, and as otherwise noted in the present disclosure, an automated cleaning procedure may be implemented dynamically upon determination of a contamination event, and without manual involvement.

With further reference to the flowchart in FIG. 2, implementing data from the data collection stage 140 of the industrial plant, in view of the models residing in the data storage network 154, contamination states may be indirectly predicted and/or determined for one or more components of the monitored client system and process (step 240).

If one or more of the predicted and/or determined contamination states correspond to a determined contamination event (i.e., "yes" in response to the query represented in step 250), the method 200 continues by providing feedback to the industrial plant for triggering an automated cleaning process (step 260).

An exemplary automated cleaning procedure that is triggered via the model may be performed on the chemical feed skid with limited or no human interaction, and may include some or all of the following operations. First, the method may initiate shut down or disabling of normal unit operation (e.g., MCA production and dosing), after which a water-only system flush is performed to remove any precursors of MCA from the system. System pH may be checked to ensure all precursors and MCA are removed from the system, followed by dosing of acid to the system via a pump connected to an acid clean port. Once filled with acid, the system may be soaked as per user settings/configuration, wherein the dosing/soaking cycle may optionally be repeated per user configuration. An MCAP/water flush may be performed to remove all acid from the system and bring the pH of the system back up to normal levels, along with a water-only flush and checking of pH to ensure the system is fully cleaned and flushed. Finally, an automated restart may be implemented to return the system to normal dosing/operating conditions, or in an embodiment a notification may be generated to a user for approval prior to restart.

If none of the predicted and/or determined contamination states correspond to a determined contamination event (i.e., "no" in response to the query represented in step 250), or alternatively after or alongside an automated cleaning process 260, the method 200 continues by providing feedback to the industrial plant for regulating upstream conditions relating to potential contamination events (step 270). For example, the method may include the ability of the system to determine if (when in use) a softener supplying water to the chemical feed stage requires replenishment, for example to reduce the need to acid clean the chemical feed stage.

In various embodiments, a determined event based on the indirectly determined process state may be a prompt for intervention other than automated corrective actions such as cleaning or system regulation, such as for example including a prompt for service or maintenance of one or more system components, or an automated scheduling of such service or maintenance, to prevent future system failures. Examples of system components which may be monitored to determine the need for service or maintenance may include pump failures, valve failures, sensor failures, and the like, as may generally supplement the aforementioned automated cleaning or regulation/control.

Certain embodiments of a method 200 as disclosed herein may be fully automatic in implementation, without requiring or prompting human intervention via, e.g., the graphical user interface. The method may otherwise be selectively implemented for one or more intermediate steps wherein operators or other authorized personnel can approve or modify automated cleaning procedures and/or control adjustments. For example, the hosted server and/or local controller may be configured to determine an amount and direction of recommended amount of brine replenishment or other adjustment to control valve positions in the input stage, and further generate a notification of the same to a designated user interface such as an operator dashboard, mobile app on a phone, etc. The authorized personnel may accordingly be prompted to enact the proposed interventions manually, or to provide feedback, via for example approval or edits to the recommended adjustment, wherein the server/controller resumes automated control of the one or more relevant system components based thereon.

Figure 3:
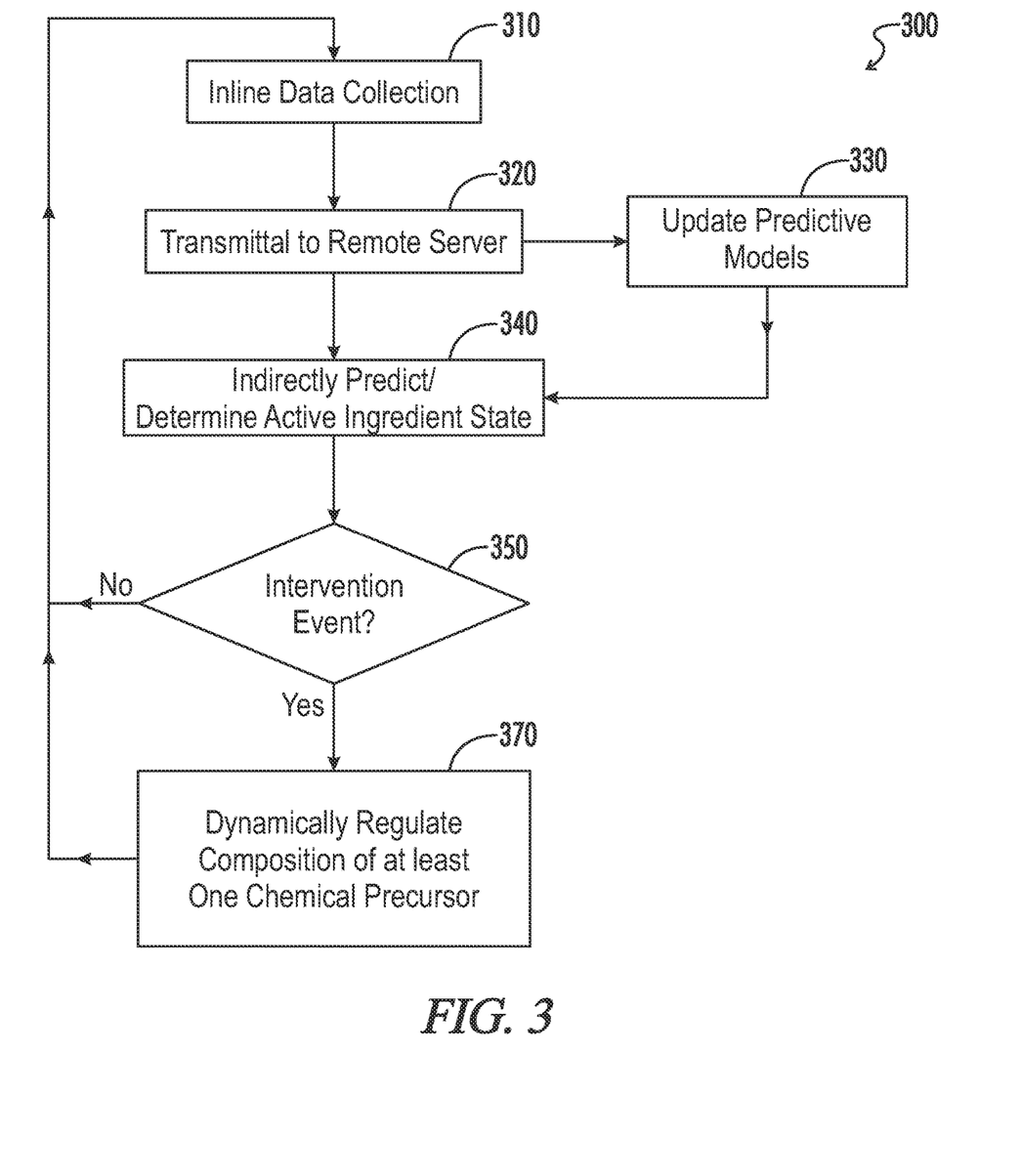
FIG. 3 is a flowchart representing another exemplary embodiment of a method as disclosed herein.

Referring now to FIGS. 1 and 3, another embodiment of a method 300 may be described with respect to the same process, e.g., the generation of an MCA mixture, which still includes online data collection (step 310) with respect to a plurality of process components in one or more of the input stage 110, the chemical feed stage 120, and the output solution 130 itself. The outputs from the data collection stage 140 are transmitted via a communications network to a remote (e.g., cloud-based) server network 152 (step 320). The server 152 may further transmit the outputs from the data collection stage 140 of the industrial plant to a separate server and/or data storage network 154 for iterative development and updating of predictive models associated with the present disclosure (step 330). As but one illustrative example, a predictive model may be constructed to account for changes in furnish, grade, equipment, and the like, wherein "digital twin" virtual representations in the cloud-based network continuously compare actual performance with expected performance to enable or otherwise facilitate the prediction of future trends and proactive interventions. Such virtual representations may include pairing of digital and physical data and further combining of the same with learning systems such as for example artificial neural networks. Real-time data may be provided throughout a process or the life cycle of a respective asset to generate virtual representations for estimation of a given parameter or performance metric, wherein subsequent comparison of predicted or estimated such parameters or metrics with a corresponding measured or determined parameter or metric may preferably be implemented as feedback for machine learning algorithms executed at the server level.

Initial models may for example be constructed based on manual/batch data and on measurable streaming data that is reliably collected and optionally aggregated from multiple chemical feed skids distributed across any number of industrial locations.

In a particular exemplary embodiment relating to modeling of the true stoichiometric ratio of two chemical precursors used to generate an oxidizing biocide in real time, wherein at least one chemical precursor has an active ingredient that varies in concentration over time, data may be collected in accordance with several components in common with the embodiment discussed above with respect to FIG. 2. For example, an online measurement of the pH value of a diluted precursor solution (e.g., hypochlorite) and an online measurement of pH of the oxidizing biocide solution (e.g., monochloramine mixture) may be driving factors to model the molar ratio. Other measurements also included in the embodiment discussed above, at substantially the same rate of data collection and for substantially the same reasoning, may include a dilution rate of a precursor (e.g., hypochlorite) in water, a hypochlorite/mcap volume ratio, one or more relevant pulp flow rates (e.g., of the water and chemical precursors), a unit status (e.g., dosing, flushing, idle), an inline antiscalant flow (e.g., to determine its concentration in the final solution and its effect thereof), and whether or not a softener is being utilized.

Additional measurements relevant to the embodiment represented in FIG. 3 may include the following components:

Inline bleach concentrations (if available), collected e.g. every sixty seconds, may optionally be obtained using hypochlorite sensors to verify model accuracy.

Manual measurements of hypochlorite concentration may be taken daily to build and train the model but will typically not be used during actual operation of the process. Larger differences in hypochlorite concentration between the new/incoming hypochlorite and the old/remaining hypochlorite will drive decomposition more quickly.

Manual measurements of hypochlorite alkalinity may be taken each time new hypochlorite is delivered, or any time a change is suspected, again to build and train the model but not typically during actual operation of the process. Alkalinity may in many cases be constant for all hypochlorite globally, and any variances in this may be tracked as potentially impacting the pH readings when all other variables are held constant.

Bulk hypochlorite temperature and/or ambient temperature may optionally be collected, e.g., every sixty seconds, as temperature is one of the driving factors for hypochlorite degradation.

Incoming water conductivity may be measured, e.g., every sixty seconds to adjust or correlate for changes in incoming water conductivity and/or dissolved solids.

A temperature of the diluted hypochlorite may be measured, e.g., every sixty seconds to determine a baseline temperature prior to reaction.

A temperature of the MCA mixture may be measured, e.g., every sixty seconds to determined exothermic changes based on chemical reaction vigor.

One-time data inputs may be provided regarding an antiscalant type to determine which specific chemistry is being used, and also whether or not a softener is being utilized.

The bleach manufacturer may optionally be correlated with data as a one-time input, unless the supplier changes of course, to for example determine and attribute differences among hypochlorite manufacturers.

Once a sufficient dataset is built, initial models may be developed relating combinations of input variables to a predicted true stoichiometric ratio of the active ingredients in the one or more precursors at issue. The models may be expected to primarily rely on streaming data but may also be augmented with manual data over time to improve the model accuracy.

The developed models advantageously enable a real-time prediction and/or estimation of the true stoichiometric ratio of the active ingredients in the chemical precursors, and considers both upstream, downstream, and environmental conditions of the oxidizing biocide generating equipment. There are numerous exemplary results and advantages of such an approach, which include improved accuracy and reliability, as well as a wider range of applicability of the model to include scenarios where one or more conditions (not monitored or included in conventional systems and methods) have an effect on the model and/or the measured controlled parameter. The models may further facilitate reductions in waste consumption of one or more precursors, resulting in improved efficiency and reduced environmental impact, and demonstrable savings of time and money on manual testing of precursor concentration.

When a modelled stoichiometric ratio is determined to be outside of optimum conditions, the system may be configured to automatically adjust the precursor volume ratio to optimize the stoichiometric ratio of the active ingredients in the one or more precursors. Alternatively, non-threshold determinations may be made in predicting that the modelled ratio will require correction. In various embodiments, these models may also be deployed remotely to provide alerts to users to prompt them to manually adjust the volume ratio of the active ingredients in the two or more precursors. Users may be automatically prompted to provide feedback on the accuracy of the models, which would preferably be used to fine tune the models. In an embodiment, upon system prediction of the need to adjust the precursor volume ratio to optimize the stoichiometric ratio of the active ingredients in the one or more precursors, a message may be generated to a user interface associated with an operator, administrator, representative, or the like for confirmation or approval to initiate an automated adjustment. Such approval may for example be received via user actuation of a dedicated button or other interface tool.

With further reference to the flowchart in FIG. 3, implementing data from the data collection stage 140 of the industrial plant, further in view of the models residing in the data storage network 154, active ingredient states may be indirectly predicted and/or determined for one or more precursors of the monitored client system and process (step 340).

If one or more of the predicted and/or determined active ingredient states correspond to a determined intervention event (i.e., "yes" in response to the query represented in step 350), the method 300 continues by providing feedback to the industrial plant for regulating upstream conditions relating to the composition of at least one chemical precursor (step 370). For example, a feed rate of an amine solution can be controlled using an associated valve or pump, or a controller may be configured to regulate a feed rate of either or both of an oxidant solution and the amine solution based on a predicted and/or determined measurement of the active oxidant and further in view of a desired molar ratio, as per specified requirements of the monochloramine production process. The process control operation may be proportional in nature, wherein the controller identifies a directional aspect of the desired correction in order to obtain (or drive the system towards) an optimal molar ratio, and the process control operation may in certain embodiments further include an integral and/or derivative aspect wherein the corrective steps account for a rate of change over time to substantially prevent overshooting.

If one or more of the predicted and/or determined active ingredient states do not yet correspond to a determined intervention event (i.e., "no" in response to the query represented in step 350), the method 300 simply continues with online data collection and repeats the aforementioned steps.

Figure 4:
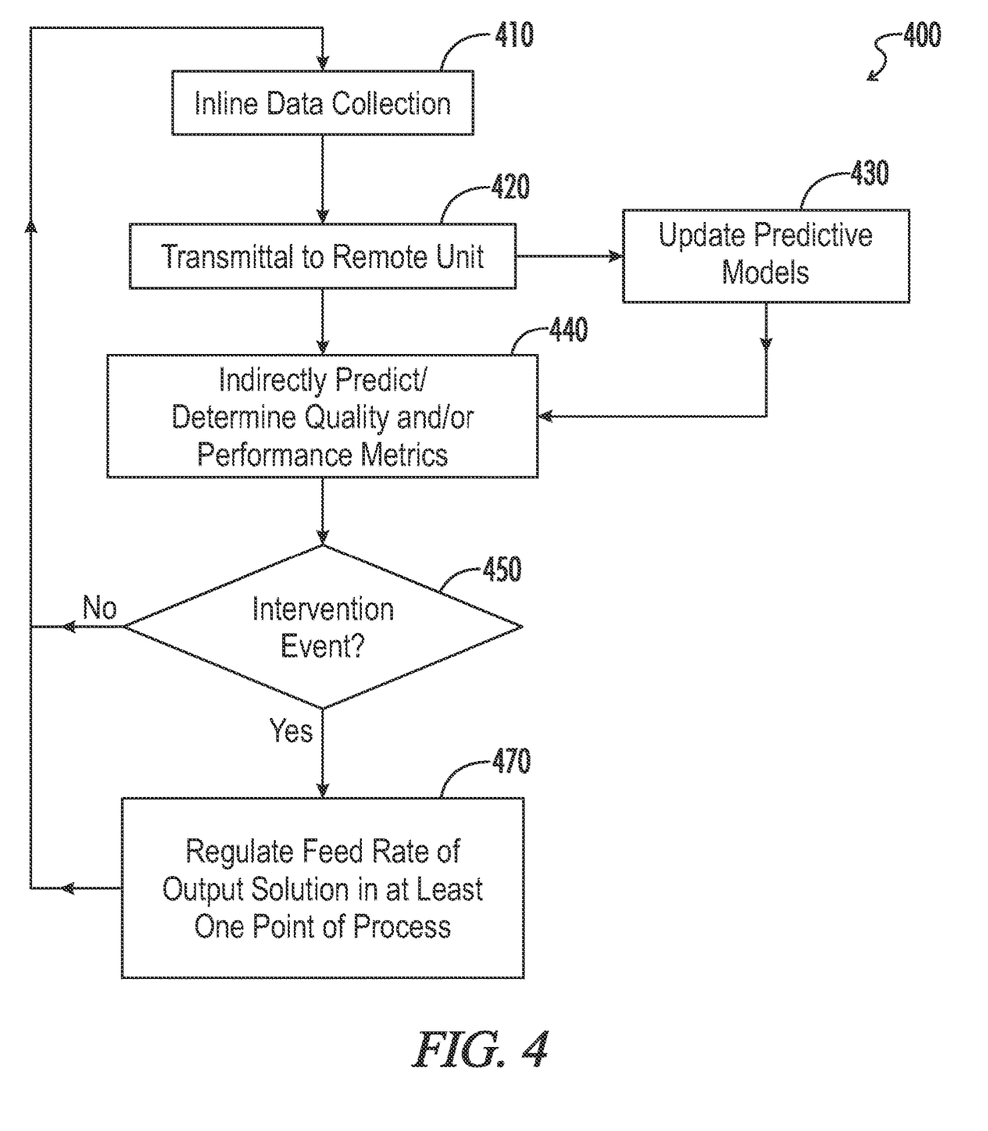
FIG. 4 is a flowchart representing an exemplary embodiment of a method as disclosed herein.

Referring now to FIGS. 1 and 4, another embodiment of a method 400 may be described with respect to substantially the same process, e.g., the generation of an oxidizing biocide solution such as an MCA mixture, which still includes online data collection (step 410) with respect to a plurality of process components in one or more of the input stage 110, the chemical feed stage 120, and the output solution 130 itself. The outputs from the data collection stage 140 are transmitted via a communications network to a remote (e.g., cloud-based) server network 152 (step 420). The server 152 may further transmit the outputs from the data collection stage 140 of the industrial plant to a separate server and/or data storage network 154 for iterative development and updating of predictive models associated with the present disclosure (step 430). As but one illustrative example, a predictive model may be constructed to account for changes in furnish, grade, equipment, and the like, wherein "digital twin" virtual representations in the cloud-based network continuously compare actual performance with expected performance to enable or otherwise facilitate the prediction of future trends and proactive interventions. Such virtual representations may include pairing of digital and physical data and further combining of the same with learning systems such as for example artificial neural networks. Real-time data may be provided throughout a process or the life cycle of a respective asset to generate virtual representations for estimation of a given parameter or performance metric, wherein subsequent comparison of predicted or estimated such parameters or metrics with a corresponding measured or determined parameter or metric may preferably be implemented as feedback for machine learning algorithms executed at the server level.

Initial models may for example be constructed based on manual/batch data and on measurable streaming data that is reliably collected and optionally aggregated from multiple process locations such as chemical feed skids distributed across any number of industrial locations. Once a sufficient dataset is built, the initial models may be developed relating combinations of input variables to determine or predict in real time an amount of oxidizing biocide contained within an application or process, to determine or predict in real time the amount of microbiological contamination contained within an application or process, to determine or predict in real time a quality of an end product being produced and/or a key performance metric of a customer process, which through optimization of said determined or predicted data may lead to improvements in operability and performance.

Accordingly, and with further reference to the flowchart in FIG. 4, implementing data from the data collection stage 140 of the industrial plant, further in view of the models residing in the data storage network 154, end product quality and/or key performance metrics associated with the industrial process may be indirectly predicted and/or determined (step 440).

If one or more of the predicted and/or determined end product quality and/or key performance metrics correspond to a determined intervention event (i.e., "yes" in response to the query represented in step 450), the method 400 continues by providing feedback to the industrial plant for regulating a feed rate of the oxidizing biocide in at least one point of the process (step 470). The process control operation may be proportional in nature, wherein the controller identifies a directional aspect of the desired correction in order to obtain (or drive the system towards) an optimal feed rate, and the process control operation may in certain embodiments further include an integral and/or derivative aspect wherein the corrective steps account for a rate of change over time to substantially prevent overshooting.

If one or more of the predicted and/or determined end product quality and/or key performance metrics do not yet correspond to a determined intervention event (i.e., "no" in response to the query represented in step 450), the method 400 simply continues with online data collection and repeats the aforementioned steps.

The above-referenced embodiment 400 may preferably include models and associated control schemes that are refined over time to optimize biocide dosage rates for a given commercial or industrial process. One of skill in the art may appreciate that the prevention of overfeeding of an oxidizing biocide may result in reductions of any one or more of the following: corrosion issues and damage end process equipment; costs of treatment programs; burdens on wastewater treatment systems; impacts on discharge limitations/permissions; and the like. One of skill in the art may further appreciate that the prevention of underfeeding of an oxidizing biocide may result in reductions of any one or more of the following: microbiological outbreaks in an end process which can lead to negative impacts on process operability or end product quality; the spread of airborne illness due to unchecked microbiological growth in commercial and/or industrial processes; and the like. For example, the overfeeding of biocide may result in detrimental exposure-based effects due to vapors that are released from the process, such as lachrymation or other health problems.

Figure 5:
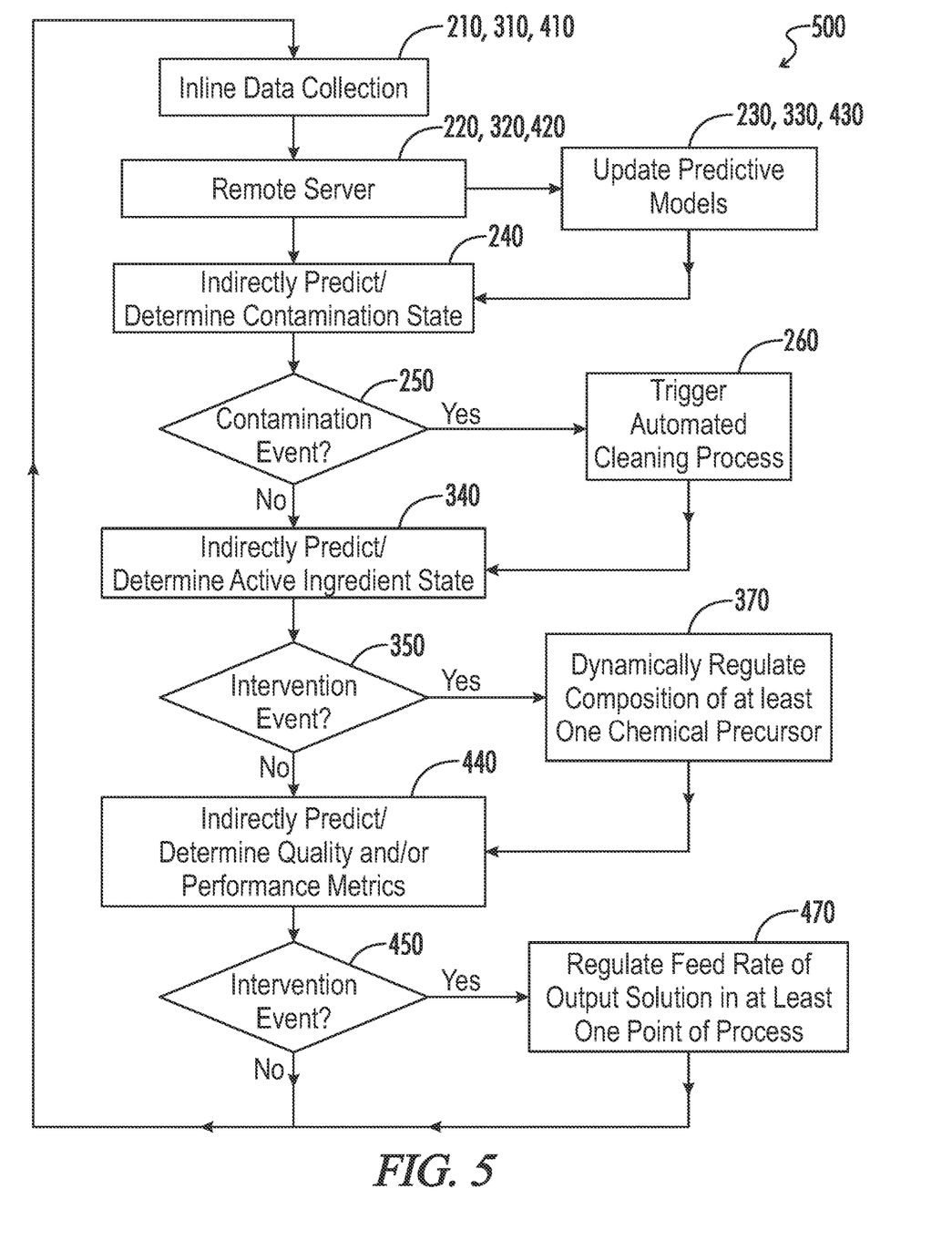
FIG. 5 is a flowchart representing another exemplary embodiment of a method as disclosed herein.

Referring next to FIG. 5, an embodiment of a method 500 as disclosed herein further illustrates the above-referenced embodiments 200, 300, 400 in executable combination for a given commercial and/or industrial process. It may be appreciated that in alternative embodiments any two of the disclosed embodiments may be combined, or that steps associated with the respective embodiments may be executed in an order that differs from the representation in FIG. 5, which is merely intended as illustrative.

Although embodiments of an invention as disclosed herein may be described for illustrative purposes in the context of certain commercial applications for pulp and paper production (e.g., graphics paper, tissue, packaging), one of skill in the art may appreciate that systems and methods as disclosed herein may foreseeably be provided for other commercial applications including but not limited to water treatment applications (e.g., cooling systems, heating systems, potable water systems, influent systems) and biomass applications (e.g., sugar ethanol, corn ethanol, beet sugar).

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may. As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item B and item C.

The term "coupled" means at least either a direct physical or electrical connection between the connected items or an indirect connection through one or more passive or active intermediary devices.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A method of dosing optimization for a chemical feed unit receiving at least one input water source and producing at least one output solution, the method comprising:
   generating signals from a plurality of online sensors, the signals corresponding to directly measured variables for respective process components;
   transmitting data to a remote server, the data corresponding to the directly measured variables for each of the respective components;
   iteratively developing, and storing in data storage, one or more models relating combinations of input variables to respective process states in at least one of the chemical feed unit, the output solution, and the at least one input water source;
   upon receiving, at the remote server, a current combination of input variables directly measured in real-time, selectively retrieving from data storage information from at least one of the one or more models relating to the current combination of input variables;
   predicting, at the remote server, a process state in at least one of the chemical feed unit, the output solution, and the at least one input water source, based on the information from at least one of the one or more models relating to the current combination of input variables; and
   automatically generating from the remote server an output feedback signal corresponding to a detected intervention event associated with the predicted process state, wherein a process actuator implements an automated intervention responsive to the output feedback signal.

2. The method of claim 1, wherein the output solution from the chemical feed unit comprises an oxidizing biocide.

3. The method of claim 2, wherein:
   the indirectly determined process state comprises an end product quality and/or a performance metric corresponding to an amount of the oxidizing biocide present; and
   the output feedback signal is generated to regulate at least one dose rate of the oxidizing biocide.

4. The method of claim 1, wherein the directly measured variables by online sensors for respective chemical feed unit components comprise measured variables corresponding to one or more of:
   a pH value of diluted hypochlorite;
   a pH value for the output solution;
   an oxidation-reduction potential; and
   an incoming water conductivity.

5. The method of claim 1, wherein:
   at least one of the models relates combinations of input variables to a predicted aggregation of contamination in at least one portion of the chemical feed unit;
   the indirectly determined process state comprises an indirectly determined contamination state of at least one portion of the chemical feed unit; and
   the output feedback signal corresponds to a detected contamination event based on the indirectly determined contamination state.

6. The method of claim 5, wherein the contamination state of the at least one portion of the chemical feed unit is indirectly determined further based on derivative variables for respective chemical feed unit components based on one or more of the directly measured variables by the online sensors, the derivative variables corresponding to one or more of:
- a hypochlorite dilution rate;
- a hypochlorite volume passing through the chemical feed unit over time; and
- a water volume passing through the chemical feed unit over time.

7. The method of claim 1, wherein:
at least one of the models relates combinations of input variables to a predicted true ratio between two or more chemical precursors used to generate the output solution;
the indirectly determined process state comprises an indirectly determined active ingredient state for at least one of the two or more chemical precursors; and
the output feedback signal corresponds to a detected intervention event based on the indirectly determined active ingredient state.

8. The method of claim 7, wherein the active ingredient state for the at least one of the two or more chemical precursors is indirectly determined from derivative variables further based on one or more of the directly measured variables by the online sensors.

9. The method of claim 7, wherein:
the output feedback signal is provided to dynamically regulate a composition of at least one chemical precursor, responsive to the indirectly determined active ingredient state.

10. The method of claim 7, wherein:
the intervention event is predicted based on a non-threshold violation with respect to the indirectly determined active ingredient state.

11. A system dosing optimization in a chemical feed unit receiving at least one input water source and producing at least one output solution, the system comprising:
a plurality of online sensors, each of the online sensors configured to produce signals corresponding to directly measured variables for respective chemical feed unit components;
one or more communications devices functionally linked to the plurality of online sensors and configured to generate messages to one or more remote servers via a communications network, wherein the generated messages comprise data corresponding to the directly measured variables for each of the respective components;
the one or more remote servers comprising or functionally linked to a data storage, and configured to iteratively develop and retrievably store in the data storage one or more models relating combinations of input variables to respective process states in at least one of the chemical feed unit, the output solution, and the at least one input water source;
the one or more servers further configured to automatically
upon receiving a current combination of input variables directly measured in real-time, selectively retrieve information from at least one of the one or more models relating to the current combination of input variables,
predict a process state in at least one of the chemical feed unit, the output solution, and the at least one input water source, based on the information from at least one of the one or more models relating to the current combination of input variables, and
generate an output feedback signal via the one or more communications devices, corresponding to a detected intervention event associated with the predicted process state,
wherein a process actuator implements an automated intervention responsive to the output feedback signal.

12. The system of claim 11, wherein the output solution from the chemical feed unit comprises an oxidizing biocide.

13. The system of claim 12, wherein:
the indirectly determined process state comprises an end product quality and/or a performance metric corresponding to an amount of the oxidizing biocide present; and
the output feedback signal is generated to regulate at least one dose rate of the oxidizing biocide.

14. The system of claim 12, wherein:
the directly measured variables by online sensors for respective chemical feed unit components comprise measured variables corresponding to one or more of:
a pH value of diluted hypochlorite;
a pH value for the monochloramine mixture;
an oxidation-reduction potential; and
an incoming water conductivity.

15. The system of claim 13, wherein:
at least one of the models relates combinations of input variables to a predicted aggregation of contamination in at least one portion of the chemical feed unit;
the indirectly determined process state comprises an indirectly determined contamination state of at least one portion of the chemical feed unit; and
the output feedback signal corresponds to a detected contamination event based on the indirectly determined contamination state.

16. The system of claim 15, wherein the contamination state of the at least one portion of the chemical feed unit is indirectly determined further based on derivative variables for respective chemical feed unit components based on one or more of the directly measured variables by the online sensors, the derivative variables corresponding to one or more of:
a hypochlorite dilution rate;
a hypochlorite volume passing through the chemical feed unit over time; and
a water volume passing through the chemical feed unit over time.

17. The system of claim 11, wherein:
at least one of the models relates combinations of input variables to a predicted true ratio between two or more chemical precursors used to generate the output solution;
the indirectly determined process state comprises an indirectly determined active ingredient state for at least one of the two or more chemical precursors; and
the output feedback signal corresponds to a detected intervention event based on the indirectly determined active ingredient state.

18. The system of claim 17, wherein the active ingredient state for the at least one of the two or more chemical precursors is indirectly determined from derivative variables further based on one or more of the directly measured variables by the online sensors.

19. The system of claim 17, wherein:
the output feedback signal is provided to dynamically regulate a composition of at least one chemical precursor, responsive to the indirectly determined active ingredient state.

20. The system of claim 17, wherein:
the intervention event is predicted based on a non-threshold violation with respect to the indirectly determined active ingredient state.

\* \* \* \* \*